United States Patent
Flippo et al.

(10) Patent No.: US 6,851,539 B2
(45) Date of Patent: Feb. 8, 2005

(54) CONVEYOR WHEEL AXLE AND YOKE SUPPORT

(75) Inventors: Bobby K. Flippo, Jonesboro, AR (US); John W. Best, Tumbling Shoals, AR (US)

(73) Assignee: Northstar Industries, Inc., Jonesboro, AR (US)

( * ) Notice: Subject to any disclaimer, the term of this patent is extended or adjusted under 35 U.S.C. 154(b) by 63 days.

(21) Appl. No.: 10/426,551

(22) Filed: Apr. 30, 2003

(65) Prior Publication Data

US 2004/0026210 A1 Feb. 12, 2004

Related U.S. Application Data

(63) Continuation-in-part of application No. 10/096,130, filed on Mar. 6, 2002, now Pat. No. 6,588,568.

(51) Int. Cl.⁷ .............................................. B65G 13/00
(52) U.S. Cl. .................................................. 193/35 TE
(58) Field of Search ..................... 193/35 TE; 198/594, 198/588, 812

(56) References Cited

U.S. PATENT DOCUMENTS

| | | | | |
|---|---|---|---|---|
| 3,276,558 A | * | 10/1966 | Guske et al. | 193/35 TE |
| 4,266,650 A | * | 5/1981 | Patel et al. | 193/35 TE |
| 4,852,712 A | * | 8/1989 | Best | 193/35 TE |
| 5,147,025 A | * | 9/1992 | Flippo | 193/35 TE |
| 5,456,348 A | * | 10/1995 | Whetsel et al. | 198/812 |
| 5,584,376 A | * | 12/1996 | Voldby | 193/35 TE |
| 6,588,568 B1 | * | 7/2003 | Flippo | 193/35 TE |

* cited by examiner

Primary Examiner—James R. Bidwell
(74) Attorney, Agent, or Firm—Kilpatrick Stockton, LLP

(57) ABSTRACT

An expandable flexible conveyor with a conveyor wheel axle and yoke support. The support includes an upper sleeve adapted to receive an axle. The support includes a lower sleeve adapted to receive a span member. A support body connects between the upper sleeve and lower sleeve. The support body includes a bend adapted to receive a portion of a downward load placed upon the plurality of rollers and axle. The upper sleeve and axle are adapted to distribute a downward load placed on the plurality of rollers across the width of the support. The bend receives the downward load and stiffens the support body to support the downward load. The lower sleeve and span member maintain the support body in a substantially vertical orientation while the downward load is on the plurality of rollers, and supported by the support body.

19 Claims, 5 Drawing Sheets

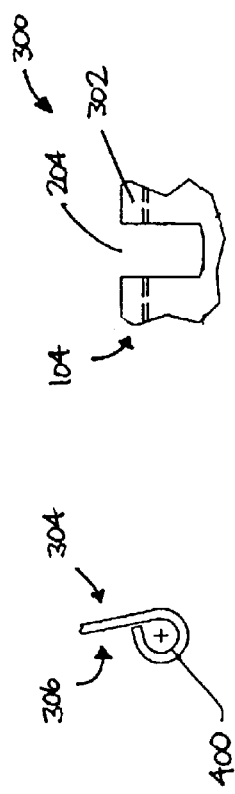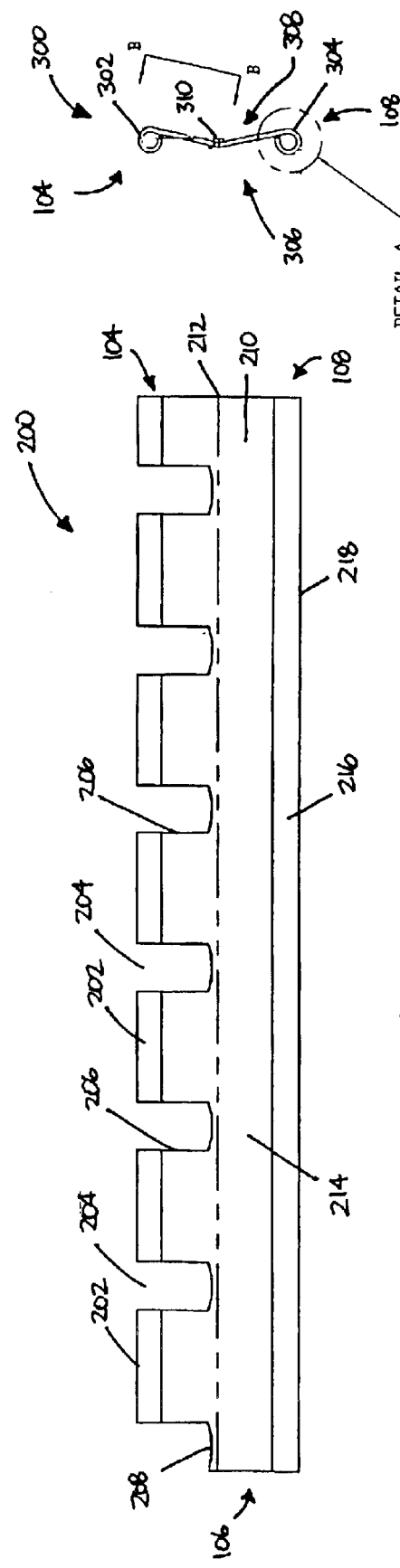

CONVEYOR WHEEL AXLE AND YOKE SUPPORT

RELATED APPLICATIONS

This is a continuation-in-part application of U.S. Ser. No. 10/096,130, entitled "Improved Multiple-Wheel Axle Support," filed on Mar. 6, 2002 now U.S. Pat. No. 6,588,568, which is incorporated by reference.

FIELD OF THE INVENTION

The invention relates generally to the field of expandable skate wheel roller conveyors, and more particularly, relates to conveyor wheel axle and yoke supports for expandable flexible roller conveyors.

BACKGROUND OF THE INVENTION

Flexible expandable conveyors which use lazy tong support frames or structures have been widely used for many years. Lazy tongs are structures formed of a set of generally parallel bars, each of which is pivotally connected at its end points and midpoint to other bars in another, transversely oriented, set of parallel bars so that the structure may be extended and retracted with scissors-like action.

Lazy tong conveyors are particularly useful to move packages and other items from one point to other points in a plant or warehouse, and in loading or unloading trucks, airplanes, or containers. They may be flexed and extended or retracted with minimum effort to lead to the desired location, vehicle, or container.

First generation lazy tong conveyors, such as the ones disclosed in U.S. Pat. No. 3,276,558 issued Oct. 4, 1966 to Guske, et al. and U.S. Pat. No. 4,266,650 issued May 12, 1981 to Patel, et. al., which are incorporated herein by reference, provided flexibility at the expense of durability. The axles connecting the lazy tong structures and carrying the skate-wheels are easily bent as packages or other items are thrown onto the conveyor and create great impacts and high loads. Such items frequently impact on only one skate-wheel and thus easily deform its supporting axle. Packages or items hitting a skate-wheel from the skate-wheel's side subject the skate wheel and axle to additional bending moments and cause further deformation.

Second generation conveyors, such as those disclosed in U.S. Pat. No. 4,852,712 issued Aug. 1, 1989 to Best, which is incorporated herein by reference, provided additional durability through the use of brace systems or other supports. The braces, which are rigidly connected to the bars of the lazy tong structures and to the axles using clips intermediate skate wheels, lend additional support to the skate-wheels and axles. Second generation conveyors are more complex than first generation conveyors. The brace systems of second generation conveyors are problematic in that they require many different parts, are expensive to build, and take longer to construct than conveyors not using brace systems. Moreover, if an axle or a component of the brace system fails, disassembling and rebuilding the axle and brace system's many parts would require a large amount of time.

Some conventional conveyors utilize axle supports to improve load bearing capability of the roller wheels connected to a combination of an axle with the axle support. In at least one conveyor, the axle support is maintained in a vertical orientation to optimize load bearing capability of the roller wheels. That conveyor has a lower span that traverses the axle support at a lower yoke portion of the axle support to maintain vertical orientation of the axle support. In some instances, the vertical orientation of the axle support cannot be maintained by the lower span, and the load bearing capability of the conveyor is reduced.

SUMMARY OF THE INVENTION

Conveyors according to various aspects and embodiments of the invention address some or all of the above issues and combinations thereof. They do so by providing a conveyor wheel axle and yoke support for expandable flexible roller conveyors.

Another aspect according to various embodiments of the invention, focuses on expandable flexible roller conveyors with conveyor wheel axle and yoke supports. A conveyor wheel axle and yoke support includes an upper sleeve adapted to receive an axle. The support includes a lower sleeve adapted to receive a yoking member. A support body connects between the upper sleeve and lower sleeve. The support body includes a bend adapted to receive a portion of a downward load placed upon the plurality of rollers and axle. The upper sleeve and axle are adapted to distribute a downward load placed on the plurality of rollers across the width of the support. The bend helps absorb and receives the downward load by providing three dimensional stiffeners to the support body and to the support/axle connection and thereby to the support/axle/lazy tong combination. They not only provide additional resistance to bending in the presence of downward loads but also stiffness and strength in directions lateral and longitudinal to the conveyor (such as, for instance, helping to keep the lazy tong structures essentially vertical). The lower sleeve and yoking member maintain the support body in a substantially vertical orientation while the downward load is on the plurality of rollers, and supported by the support body.

Another aspect of the invention in accordance with various embodiments of the invention includes methods for manufacturing axle and yoke supports for expandable flexible roller conveyors. One such method includes forming a support member including, an upper portion with a plurality of wheel cut outs along an upper edge of the support member, a central portion, and a lower portion with a lower edge. The method also includes adapting the upper edge of the support member so that the rolled upper edge is adapted to receive an axle. Furthermore, the method includes adapting the lower edge of the support member so that the rolled lower edge is adapted to receive a yoking member. Moreover, the method includes creasing the central portion, wherein the central portion is adapted to receive a downward load transferred from the upper portion of the support member, and further adapted to stiffen the support member when the downward load is transferred from the upper portion to the central portion of the support.

Objects, features and advantages of various systems, methods, and apparatuses according to various embodiments of the invention include:

(1) Providing stiffening support through a conveyor wheel axle and yoke support of an expandable flexible roller conveyor;

(2) Providing vertical support for a conveyor wheel axle and yoke support of an expandable flexible roller conveyor;

(3) Providing yoking support for a conveyor wheel axle and yoke support of an expandable flexible roller conveyor;

(4) Increased resistance to stresses and bending applied to axles of roller conveyors in any or all of three dimensions; and (5) Increased resistance to lateral stresses and bending moments applied to roller conveyors.

Other objects, features and advantages of various aspects and embodiments according to the invention are apparent from the other parts of this document.

BRIEF DESCRIPTION OF THE DRAWINGS

FIG. 2 illustrates a partial front view of an unformed conveyor axle and yoke support for expandable flexible roller conveyors in accordance with various embodiments of the invention.

FIG. 3 is a side view of a formed conveyor axle and yoke support for expandable flexible roller conveyors in accordance with various embodiments of the invention.

FIG. 4 is a detail view of the conveyor axle and yoke support shown in FIG. 3.

FIG. 5 is a sectional view of the conveyor axle and yoke support shown in FIG. 3.

DETAILED DESCRIPTION OF SPECIFIC EMBODIMENTS

Various embodiments of the invention address some or all of the above issues and combinations thereof. They do so by providing conveyor wheel axle and yoke supports for expandable flexible roller conveyors. The conveyor axle and yoke supports provide support between wheels of a multiple wheel axle spanning expandable flexible roller conveyor systems. Typically, an expandable flexible roller conveyor system includes at least two parallel lines of lazy tong scissor pairs. Adjacent scissor pairs are pivotally connected at their upper ends and lower ends. Lower and upper connections of two or more such lazy tong structures are in turn spanned by axles or other preferably cylindrical structures. The upper axles typically support a number of skate wheels. Conveyor wheel axle and yoke supports according to aspects of the invention provide additional strength, stiffness, rigidity, and/or resistance to longitudinal and lateral or vertical bending moments and stresses, and extends vertically downward from the axle to a lower portion that maintains the lower ends of the scissor pair ends beneath the axle.

Figure 1:
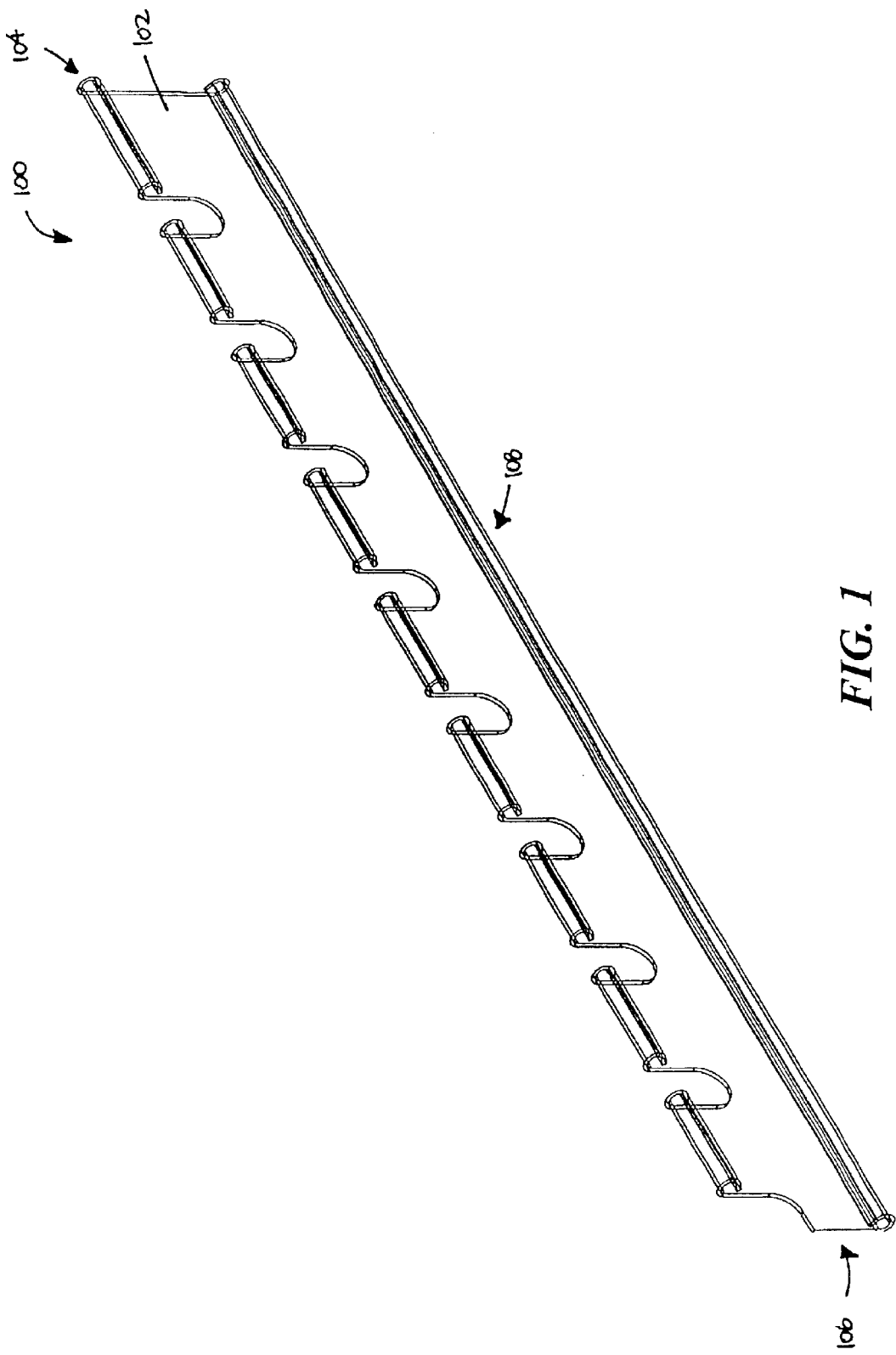
FIG. 1 is a perspective view of a conveyor axle and yoke support expandable flexible roller conveyors in accordance with various embodiments of the invention.

FIG. 1 is a perspective view of a conveyor axle and yoke support for expandable flexible roller conveyors in accordance with various embodiments of the invention. A conveyor axle and yoke support 100 includes a formed body 102 with an upper intermittent intermediate sleeve portion 104, a central yoke support portion 106, and lower yoke support portion 108. The conveyor axle and yoke support 100 can be made from material including, but not limited to, 14 gage steel or plastic. Embodiments of a conveyor axle and yoke support 100 in accordance with the invention can be stamped, roll curled, molded, or otherwise prefabricated or fabricated as shown. An example of a conveyor axle and yoke support in use with an expandable flexible roller conveyor is shown and described in FIG. 10.

FIG. 2 illustrates a partial front view of an unformed conveyor axle and yoke support 200 for expandable flexible roller conveyors in accordance with various embodiments of the invention. The upper intermittent intermediate sleeve portion 104 of FIG. 1 is formed by a series of rolled marginal edges 202. Wheel well cutouts 204 with side walls are formed by separate downward extensions 206 of the upper intermittent intermediate sleeve portion 104. A lower wall 208 is formed by the merger of the separate downward extensions 206 into a unitary upper plane area 210.

The central yoke support portion 106 includes a stiffening axis 212 in a stiffening region 214. The stiffening axis 212 can include a stiffening bend at various angles, sizes, and widths as illustrated in FIG. 3, and FIGS. 6–8.

The lower yoke support portion 108 includes a sleeve portion 216 spanning at least part of the lower portion of the conveyor axle and yoke support 200. In this embodiment, the sleeve portion 216 spans the width of the conveyor axle and yoke support 200, and is formed by rolling a lower edge 218 of the support 200. Other embodiments can span a portion of the width of the conveyor axle and yoke support 200 either intermittently or with a single span having a width less than the entire width of the conveyor axle and yoke support 200.

The embodiment of the unformed conveyor axle and yoke support 200 shown in FIG. 2 is approximately 18.2 inches in width, approximately 3.4 inches in height, and has a material thickness of approximately 0.075 inches. This embodiment includes one wheel cut out 204 at one end of the support 200 and six additional wheel cut outs 204 along the width of the support 200. Each wheel cut out 204 is approximately 0.8 inches in width, and a side wall of each wheel cut out 204 is laterally spaced apart from a side wall of an adjacent wheel cut out 204 by a distance of approximately 1.9 inches.

Other embodiments of an unformed conveyor axle and yoke support 200 can include greater or fewer wheel cut outs 204. Lateral spacing between wheel cut outs 204 is preferably maintained at approximately 1.9 inches, but can vary depending upon the desired load bearing capability of the support 200. For example, a conveyor axle and yoke support approximately 24 inches in width can have 9 wheel cut outs, and a conveyor axle and yoke support approximately 30 inches in width can have 11 wheel cut outs.

FIG. 3 is a side view of a formed conveyor axle and yoke support for expandable flexible roller conveyors in accordance with various embodiments of the invention. A formed conveyor axle and yoke support 300 can be made from the unformed support shown as 200 in FIG. 2. The upper intermittent intermediate sleeve portion 104 of FIG. 2 can be rolled downward and inward into a curled sleeve 302 configured to receive an axle, rod, or member (not shown). Preferably, the axle, rod, or member is a cylindrically-shaped axle that spans at least the width of the support 300. Note that the upper intermittent intermediate sleeve portion 104 does not have to completely surround the circumference of the axle, rod, or member. The sleeve portion 216 of FIG. 2 can be rolled upward and inward into a curled sleeve 304 configured to receive an axle, rod, or member (not shown). Note that the sleeve portion 216 does not have to completely surround the circumference of the axle, rod, or member. Preferably, the axle, rod, or member is a cylindrically-shaped yoking member that spans at least the width of the support 300. "Detail A" of the curled sleeve 304 is shown and described in FIG. 4. Each of the curled sleeves 302, 304 is curled towards a front portion 306 of the conveyor axle and yoke support 300.

As shown in FIG. 2, the stiffening axis 212 is positioned slightly below the lower wall 208 of the wheel well cutouts 204 along the width of the conveyor axle and yoke support 200. Turning back to FIG. 3, a stiffening bend 308 is formed at or near the stiffening axis 212. Between the upper intermittent intermediate sleeve portion 104 and lower yoke support portion 108, the stiffening bend 308 in the central yoke support portion 106 is a slight inward curve along a rear portion 310 of the conveyor axle and yoke support 300. In this embodiment, the vertical height of the formed conveyor axle and yoke support 300 is approximately 2.8 inches.

In FIG. 4, a detailed view of curled sleeve 304 in FIG. 3 is shown. The curled sleeve 304 of the conveyor axle and yoke support 100 is rolled upward and inward towards the front portion 306 of the support 100. In this embodiment, the interior radius 400 of the sleeve portion 214 is approximately 0.130 inches.

FIG. 5 illustrates sectional view "B—B" of the conveyor axle and yoke support shown in FIG. 3. A wheel cut out 204 is shown adjacent to a curled sleeve 302 in the upper intermittent intermediate sleeve portion 104 of the conveyor axle and yoke support 300. In this embodiment, the width of the wheel cut out 204 is approximately 0.8 inches, and the vertical height of each side wall of the wheel cut out 204 is approximately 1.2 inches. The lower wall is slightly curved with a concave shape, and machined at approximately a radius of approximately 1.3 inches. Measured from the bottom of the lower wall to the top of the wheel cut out 204, the vertical height measures approximately 1.27 inches.

Figure 8:
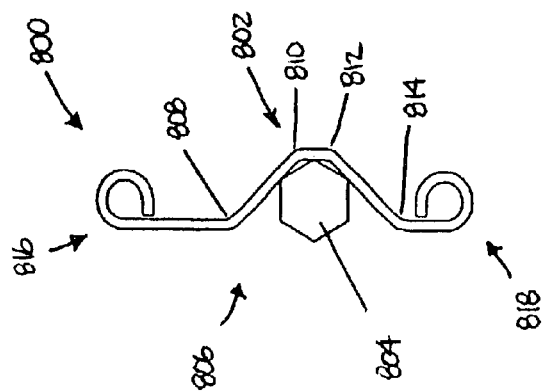
FIG. 8 is a side view of another conveyor axle and yoke support for expandable flexible roller conveyors in accordance with various embodiments of the invention.
Figure 7:
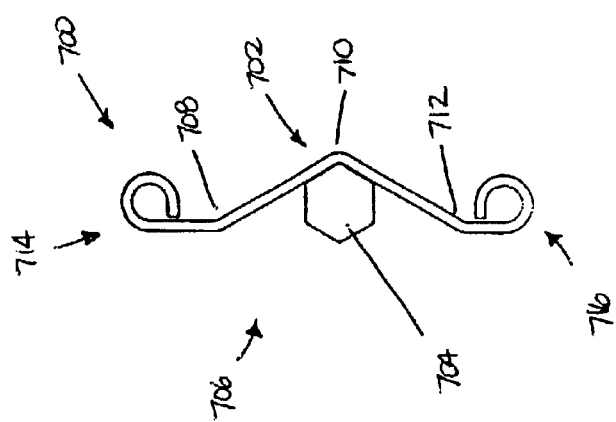
FIG. 7 is a side view of another conveyor axle and yoke support for expandable flexible roller conveyors in accordance with various embodiments of the invention.
Figure 6:
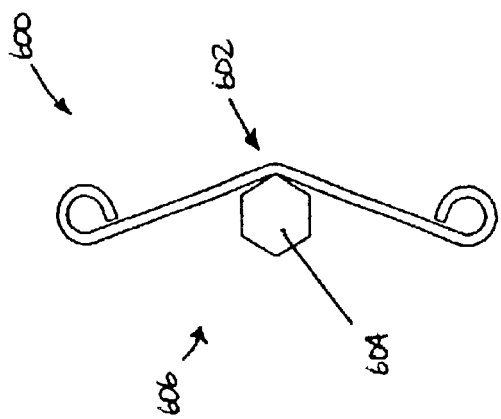
FIG. 6 is a side view of a conveyor axle and yoke support for expandable flexible roller conveyors in accordance with various embodiments of the invention.

FIGS. 6–8 illustrate various configurations for a conveyor wheel axle and yoke support for an expandable flexible roller conveyor. These views are similar to the support and associated stiffening bend shown as 300 and 306, respectively, in FIG. 3. Note that the support and stiffening bend can vary in shape, size, and configuration in accordance with various embodiments of the invention. A stiffening bend for a conveyor axle and yoke support can include more than one bend in the support. Preferably, a stiffening bend is substantially parallel with or collinear with a respective stiffening axis of the conveyor axle and yoke support. In most configurations, a stiffening bend provides stability to the conveyor axle and yoke support when a downward load is placed on the upper portion of the support. In most cases, the configuration of a stiffening bend will be based upon the desired load bearing capability of the conveyor, and the manufacturing cost for the bend configuration. Various examples of a stiffening bend for a conveyor wheel axle and yoke support are described below.

FIG. 6 is a side view of a conveyor axle and yoke support 600 in accordance with various embodiments of the invention. The conveyor axle and yoke support 600 includes a stiffening bend 602. An intermediate yoking or support member 604 is positioned on a rear portion 606 of the support 600. The stiffening bend 602 is a slight angle in the rear portion 606 of the conveyor axle and yoke support 600, near the center of the support 600. The intermediate yoking or support member 604 contacts the support 600 at the stiffening bend 602. In this embodiment, the center-to-center height of the formed conveyor axle and yoke support 600 is approximately 2.76 inches.

FIG. 7 is a side view of another conveyor axle and yoke support 700 in accordance with various embodiments of the invention. The conveyor axle and yoke support 700 includes a stiffening bend 702. An intermediate yoking or support member 704 is positioned on a rear portion 706 of the support 700. The stiffening bend 702 is a series of three bends 708, 710, 712 in the rear portion 706 of the conveyor axle and yoke support 700. The two outer bends 708, 712 are positioned near respective rolled ends 714, 716 of the support 700, while the intermediate bend 710 is near the center of the support 700. The three bends 708, 710, 712 create a concave L-shape in the rear portion 706 of the support 700 for contact with the intermediate yoking or support member 704. In this embodiment, the center-to-center vertical height of the formed conveyor axle and yoke support 700 is approximately 2.57 inches.

FIG. 8 is a side view of another conveyor axle and yoke support 800 in accordance with various embodiments of the invention. The conveyor axle and yoke support 800 includes a stiffening bend 802. An intermediate yoking or support member 804 is positioned on a rear portion 806 of the support 800. The stiffening bend 802 is a series of four bends 808, 810, 812, 814 in the conveyor axle and yoke support 800. The two outer bends 808, 814 are positioned near respective rolled ends 816, 818 of the support 800, while the intermediate bends 810, 812 are near the center of the support 800. The four bends 808, 810, 812, 814 create a concave U-shape in the rear portion 806 of the support 800 for contact with the intermediate yoking or support member 804. In this embodiment, the center-to-center vertical height of the formed conveyor axle and yoke support 800 is approximately 2.32 inches.

Figure 9:
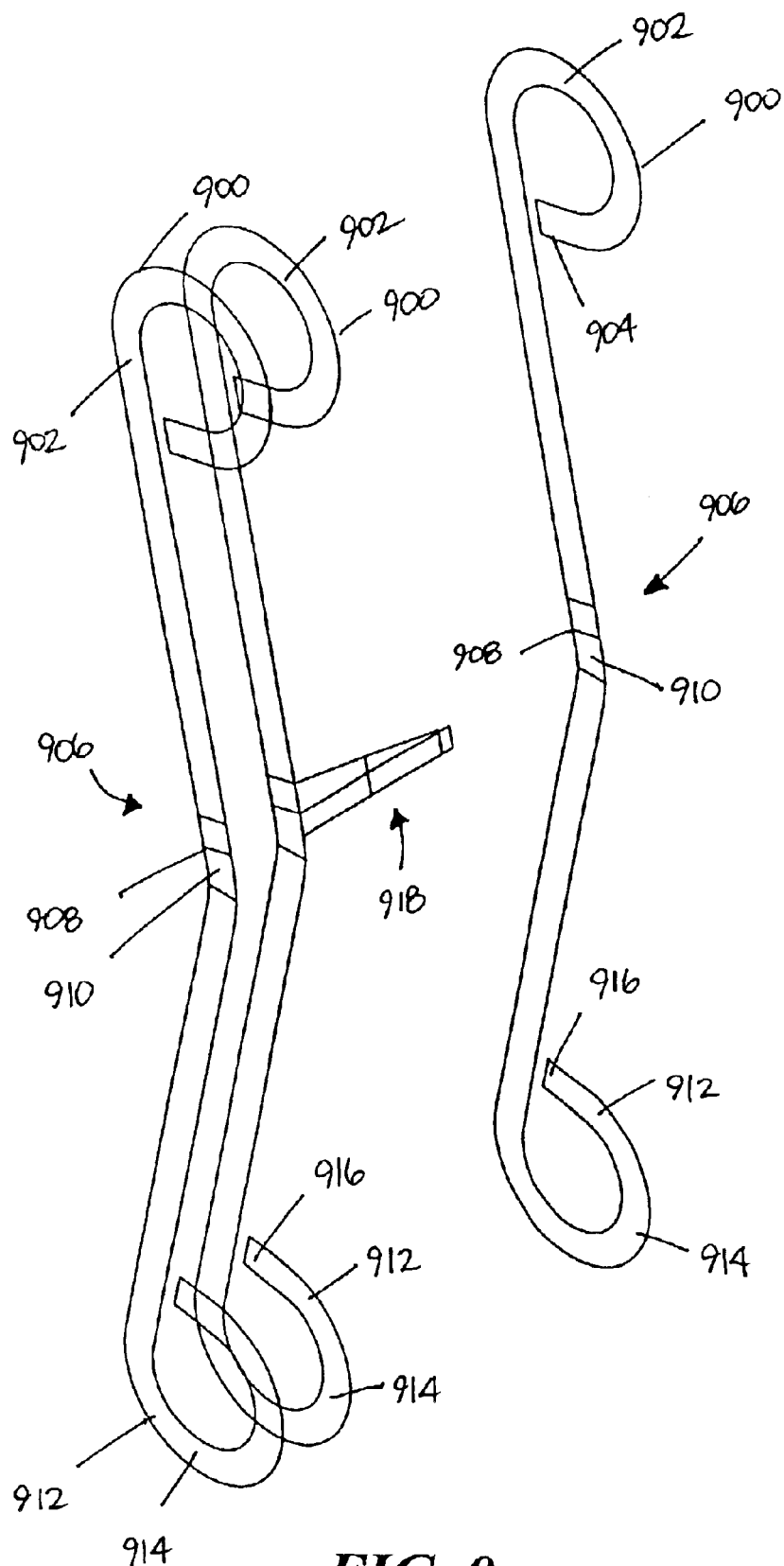
FIG. 9 is a perspective edge view of a conveyor axle and yoke support for expandable flexible roller conveyors in accordance with various embodiments of the invention.

FIG. 9 is a perspective edge view of another conveyor axle and yoke support in accordance with various embodiments of the invention. In this embodiment, multiple conveyor axle and yoke supports 900 can be adapted to span an upper axle and a lower span member of an expandable flexible roller conveyor. A conveyor and yoke support 900 according to this embodiment has an upper sleeve portion 902 formed by a rolled marginal edge 904. Note that the upper sleeve portion 902 is adapted to receive an axle, rod, or member (not shown). Further, the upper sleeve portion 902 does not have to completely surround the circumference of the axle, rod, or member. Thus, multiple conveyor axle and yoke supports 900 can be used to span an upper axle inserted through a series of respective upper sleeve portions 902. Wheels (not shown) for the expandable flexible roller conveyor can be positioned between adjacent conveyor axle and yoke supports 900.

A central yoke support portion 906 includes a stiffening axis 908 in a stiffening region 910. The stiffening axis 908 can include a stiffening bend at various angles, sizes, and widths as illustrated in FIG. 3, and FIGS. 6–8. Note that the support and stiffening bend can vary in shape, size, and configuration in accordance with various embodiments of the invention. A stiffening bend for a conveyor axle and yoke support can include more than one bend in the support. Preferably, a stiffening bend is substantially parallel with or collinear with a respective stiffening axis of the conveyor axle and yoke support. In most configurations, a stiffening bend provides stability to the conveyor axle and yoke support when a downward load is placed on the upper portion of the support. In most cases, the configuration of a stiffening bend will be based upon the desired load bearing capability of the conveyor, and the manufacturing cost for the bend configuration. Various examples of a stiffening bend for a conveyor wheel axle and yoke support are described above.

A lower yoke support portion 912 includes a lower sleeve portion 914. The lower sleeve portion 914 spans the width of the conveyor axle and yoke support 900, and is formed by rolling a lower edge 916 of the support 900. Note that the lower sleeve portion 914 is adapted to receive an axle, rod, or member (not shown). Further, the lower sleeve portion 914 does not have to completely surround the circumference of the axle, rod, or member. Thus, multiple conveyor axle and yoke supports 900 can be used to span a lower span member inserted through a series of respective lower sleeve portions 914.

Note that in this embodiment, as well as those shown in FIGS. 6–8, an intermediate yoking or support member 918 near the central yoke support portion 906 of the support 900 can connect adjacent supports 900. The intermediate yoking or support member 918 provides horizontal spacing between adjacent supports 900 as well as additional vertical stability for individual supports 900.

Figure 10:
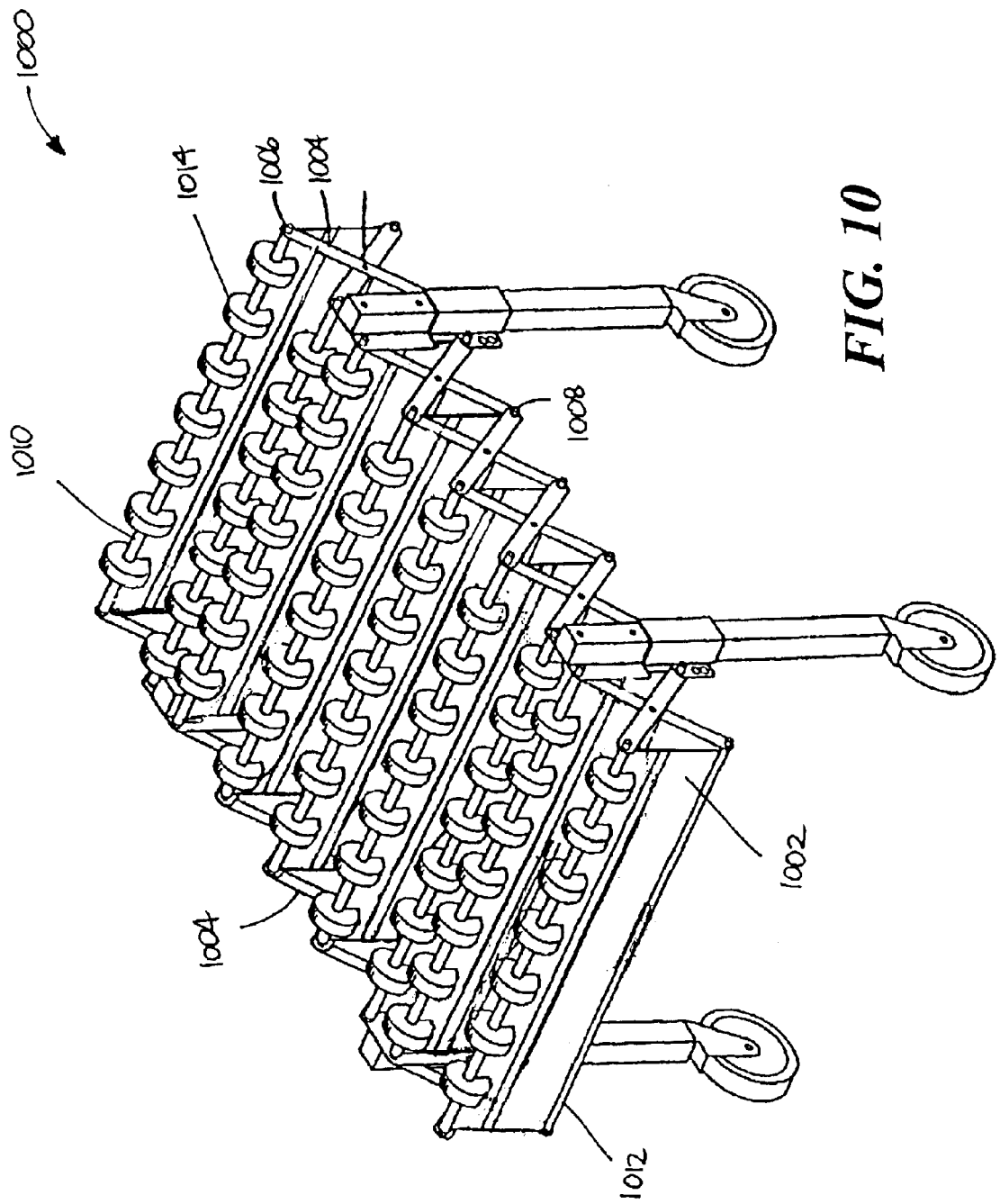
FIG. 10 is a perspective view of an expandable flexible roller conveyor in accordance with various embodiments of the invention.

FIG. 10 is a perspective view of an expandable flexible roller conveyor 1000 with a series of conveyor axle and yoke supports 1002 in accordance with various embodiments of the invention. Two parallel lines of lazy tong scissor pairs 1004 are aligned at each end of the series of conveyor axle and yoke supports 1002. Adjacent scissor pairs are pivotally connected at their upper ends 1006 and lower ends 1008. Lower and upper connections of two or more such lazy tong structures are in turn spanned by axles 1010, 1012 or other preferably cylindrical structures. The upper axles 1010 typically support a number of skate wheels 1014. Conveyor wheel axle and yoke supports 1002 according to aspects of the invention provide additional strength, stiffness, rigidity, and/or resistance to longitudinal and lateral or vertical bending moments and stresses, and extend vertically downward from the upper axle 1010 to a lower portion that maintains the lower ends 1008 of the scissor pair ends beneath the axle 1010.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The invention we claim is:

1. An expandable flexible conveyor for supporting a downward load, wherein the conveyor includes a plurality of lazy tong structures; comprising:
    a plurality of axle and yoke supports, spanning at least part of the distance between two lazy tong structures, the support comprising:
        an upper sleeve adapted to receive an axle;
        a lower sleeve adapted to receive a span member; and
        a support body connecting the upper sleeve and lower sleeve, the support body comprising:
            a bend adapted to provide resistance to a portion of a downward load placed upon the axle to which the support is connected;
            whereby the upper sleeve and axle help absorb a downward load placed on the plurality of rollers across the width of the support, the bend stiffens the support body to provide additional resistance to the downward load from the upper sleeve and axle; and the lower sleeve and span member maintain the support body in a substantially vertical orientation.

2. The conveyor of claim 1, wherein the upper sleeve is a rolled upper edge of the support body.

3. The conveyor of claim 1, wherein the lower sleeve is a rolled lower edge of the support body.

4. The conveyor of claim 1, wherein the bend comprises a slight angle in the support.

5. The conveyor of claim 1, wherein the bend comprises a series of angles in the support.

6. The conveyor of claim 1, wherein the bend comprises at least one angle that spans the width of the support.

7. An axle and yoke support for an expandable flexible conveyor; comprising:
    an upper sleeve adapted to receive a first axle;
    a lower sleeve adapted to receive a lower span;
    a support body connected between the upper sleeve and lower sleeve; and
    a bend in the support body, the bend adapted to receive a portion of a downward load transferred from the upper sleeve to the support body, whereby the bend stiffens the support body when the downward load is transferred to the support body.

8. The support of claim 7, wherein the upper sleeve is a rolled upper edge of the support body.

9. The support of claim 7, wherein the lower sleeve is a rolled lower edge of the support body.

10. The support of claim 7, wherein the bend comprises a slight angle in the support.

11. The support of claim 7, wherein the bend comprises a series of angles in the support.

12. The support of claim 7, wherein the bend comprises at least one angle that spans the width of the support.

13. An axle and yoke support for an expandable flexible conveyor; the axle and yoke support comprising:
    an upper sleeve adapted to receive a first axle;
    a lower sleeve adapted to receive a lower span;
    a support body connected between the upper sleeve and lower sleeve;
    a bend in the support body, the bend adapted to receive a portion of a downward load transferred from the upper sleeve to the support body, whereby the bend stiffens the support body when the downward load is transferred to the support body; and
    a support member adapted to connect to an adjacent axle and yoke support.

14. The support of claim 13, wherein the upper sleeve is a rolled upper edge of the support body.

15. The support of claim 13, wherein the lower sleeve is a rolled lower edge of the support body.

16. The support of claim 13, wherein the bend comprises a slight angle in the support.

17. The support of claim 13, wherein the bend comprises a series of angles in the support.

18. The support of claim 13, wherein the bend comprises at least one angle that spans the width of the support.

19. The support of claim 13, wherein the support member is adjacent to the bend in the support body.

\* \* \* \* \*